United States Patent Office 3,478,081
Patented Nov. 11, 1969

---

3,478,081
CYANOETHYLATED CYCLOHEXANE-BIS-ALKYL AMINES
Stuart A. Harrison, Minneapolis, and John E. Wicklatz, Wayzata, Minn., assignors to General Mills, Inc., a corporation of Delaware
No Drawing. Filed Sept. 10, 1964, Ser. No. 395,609
Int. Cl. C07c *121/46, 87/02;* C08f *7/12*
U.S. Cl. 260—464       2 Claims

ABSTRACT OF THE DISCLOSURE

Compounds having the following formula:

$$\begin{array}{c} N(H)_n R_p \\ | \\ (CH_2)_m \\ | \\ CH \\ H_2C \diagup \diagdown CH_2 \\ H_2C \diagdown \diagup CH_2 \\ CH \\ | \\ (CH_2)_m \\ | \\ N(H)_n(R)_p \end{array}$$

where the R groups are the same and are

—CH$_2$CH$_2$CN or $$-\overset{CH_3}{\underset{|}{C}}HCH_2CN$$

$m$ is 1 or 2, $n$ is 0 or 1, $p$ is 1 or 2 and the sum of $n$ plus $p=2$. The compounds are particularly useful as epoxy curing agents.

---

The present invention relates to novel amino compounds and to their use for curing epoxy resins to provide products of good flexibility and high heat distortion temperature.

The products of the present invention have the following formula:

$$\begin{array}{c} N(H)_n(R)_p \\ | \\ (CH_2)_m \\ | \\ \bigcirc \\ | \\ (CH_2)_m \\ | \\ N(H)_n(R)_p \end{array}$$

where the ring may be saturated or unsaturated, R may be

—CH$_2$CH$_2$CN $$-\overset{CH_3}{\underset{|}{C}}HCH_2CH$$

$$-CH_2\overset{CH_3}{\underset{|}{C}}HCN$$

—CH$_2$CH$_2$CH$_2$NH$_2$ $$-\overset{CH_3}{\underset{|}{C}}HCH_2CH_2NH_2$$

or $$-CH_2-\overset{CH_3}{\underset{|}{C}}HCH_2NH_2$$

$m$ may be 1 or 2, $n$ may be 0 or 1, $p$ may be 1 or 2 and $n$ plus $p$ equals 2.

The compounds having the cyanoalkyl group in general are solids and are especially useful for making solid mixtures with epoxy resins, which have a useful shelf life in the uncured form and which may be readily cured by heating. The amine forms of the compounds in general are liquids and may be used as any other liquid curing agent for epoxy resins. The compounds in general provide good flexibilities in the cured epoxy resins and high heat distortion temperatures.

The products are made readily by reacting acrylonitrile, crotononitrile, or methacrylonitrile with certain cyclic amines such as 1,4-cyclohexane-bis-methylamine, 1,4-cyclohexane-bis-ethylamine, 2,3,5,6 - tetrachloro p-xylene α,α'-diamine, 1,4-benzene-bis-methylamine and the like. These cyclic amines are known and methods of preparing them are available in the literature. Some of them are available commercially.

While the invention can be used with any of the previously mentioned nitriles, the details of the invention will be described with particular reference to acrylonitrile. In the reaction of the cyclic amine with acrylonitrile, the reaction may be conducted so that either one or two mols of acrylonitrile may react with each primary amine group or any ratio between one and two may be used. The adduct will then contain a number of cyanoethyl groups, depending upon the quantity of acrylonitrile employed. This may vary from one acrylonitrile group on each amine group to two on each amine group.

Where it is desired to obtain a higher degree of amine functionality (more replaceable hydrogen atoms), or to obtain a liquid curing agent, one or more of the nitrile groups of the cyanoalkyl branches of compounds I, II, and III and of the completely cyanoalkylated compound $$\begin{array}{c} N(R'CN)_2 \\ | \\ (CH_2)_m \\ | \\ \bigcirc \\ | \\ (CH_2)_m \\ | \\ N(R'CN)_2 \end{array}$$
(IV)

may be hydrogenated to amino groups in a conventional manner to produce curing agents containing at least one terminal primary amine group up to as many as four terminal primary amine groups.

Certain of these adducts, those in which at least one nitrogen atom per molecule contains a replaceable hydrogen, can be used directly as curing agents for epoxides. Thus the following classes of compounds may be employed as curing agents without further chemical modification:

$$\begin{array}{ccc}
\text{NHR'CN} & \text{NHR'CN} & \text{N(R'CN)}_2 \\
| & | & | \\
(CH_2)_m & (CH_2)_m & (CH_2)_m \\
\bigcirc & \bigcirc & \bigcirc \\
(CH_2)_m & (CH_2)_m & (CH_2)_m \\
| & | & | \\
NH_2 & NHR'CH & NHR'CN \\
(I) & (II) & (III)
\end{array}$$

where the R' is the hydrocarbon group of any of the above-mentioned nitriles. Of these, the preferred compounds are those which contain at least one replaceable hydrogen on each nitrogen atom of the original amino compound, i.e., compounds I and II.

In all the above compounds, an aromatic diamine may be used as the starting material. The aromatic ring subsequently may be hydrogenated to the saturated form if desired.

As was pointed out previously, the cyanoalkyl forms of the compound generally are solid at ordinary temperatures and are thus ideally suited for admixture with solid epoxy resins to produce solid, stable powders which may be cured to the insoluble and infusible form by the mere application of heat. One means of accomplishing this is to merely melt the curing agent and the epoxy resin, mix them together for a short period of time and then chill them to a solid form which can be ground to a fine powder.

It is also possible to use the solid cyanoalkyl products with liquid epoxies but, in this case, a sort of a slushy, plastic mixture results which is not adapted to the production of dry powders but which may be used to cure in the ordinary manner to produce, for example, suitable coatings. The hydrogenated cyanoalkyl products having the free primary amine groups are generally liquid and would be used in the ordinary manner as liquid epoxy curing agents are used.

The product of the present invention may be used in admixture with other epoxy resin curing agents as will be seen from the examples. Furthermore, the present curing agents may be used in minor amounts to react with epoxy resins and to modify them so that they can thereafter be cured with other typical epoxy resin curing agents.

The compounds of the present invention are useful for curing epoxy resins in general. These include the following types:

The epoxy resins which can be used in preparing the compositions of the present invention comprise those materials possessing more than one vicinal epoxy group, i.e., more than one

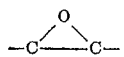

group. These compounds may be saturated or unsaturated, aliphatic, cycloaliphatic, aromatic or heterocyclic, and may be substituted, if desired, with non-interfering substituents such as chlorine, hydroxyl groups, ether radicals and the like. The polyepoxides may be monomeric or polymeric. The epoxy group may be terminal or nonterminal.

For clarity, many of the polyepoxides will be referred to hereinafter in terms of their epoxy equivalency. The term "epoxy equivalency refers to the number of epoxy groups contained in the average molecule of the desired material. The epoxy equivalency is obtained by dividing the average molecular weight of the polyepoxide by the epoxide equivalent weight. The epoxide equivalent weight is determined by heating one gram sample of the polyepoxide with an excess of pyridinium chloride dissolved in pyridine at the boiling point for 20 minutes. The excess pyridinium chloride is then back-titrated with 0.1 N sodium hydroxide to the phenolphthalein end point. The epoxide value is calculated by considering one HCl as an equivaent of one epoxide. This method is used to obtain all epoxide values reported herein, unless otherwise stated.

If the polyepoxides are single monomeric compounds having all of their epoxide groups intact, their epoxy equivalency will be whole integers, such as 2, 3, 4 and 5. However, in the case of the polymeric-type polyepoxides, many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5 and the like.

The monomeric-type polyepoxide compounds may be exemplified by the following:

vinylcyclohexene dioxide,
epoxidized soyabean oil,
butadiene dioxide,
1,4-bis(2,3-epoxypropoxy) benzene,
1,3-bis(2,3-epoxypropoxy) benzene,
4,4'-bis(2,3-epoxypropoxy) diphenyl ether,
1,8-bis(2,3-epoxypropoxy) octane,
1,4-bis(2,3-epoxypropoxy) cyclohexane,
4,4'-bis(2-hydroxy-3,4-epoxybutoxy) diphenyldimethylmethane,
1,3-bis(4,5-epoxypentoxy)-5-chlorobenzene,
1,4-bis(3,4-epoxybutoxy)-2-chlorocyclohexane,
diglycidyl ether,
1,3-bis(2-hydroxy-3,4-epoxybutoxy) benzene,
1,4-bis(2-hydroxy-4,5-epoxypentoxy) benzene,
1,2,5,6-di-epoxy-3-hexyne,
1,2,5,6-di-epoxyhexane, and
1,2,3,4-tetra(2-hydroxy-3,4-epoxybutoxy) butane.

Other examples of this type include the glycidyl polyethers of the polyhydric phenols obtained by reacting a polyhydric phenol with a great excess, e.g., 4 to 8 mol excess, of a halogen-containing epoxide in an alkaline medium. Polyhydric phenols that can be used for this purpose include bisphenol, resorcinol, catechol, hydroquinone, methyl resorcinol, or polynuclear phenols, such as 2,2-bis(4-hydroxyphenyl) butane, 4,4'-dihydroxybenzophenone, bis(4-hydroxyphenyl) ethane, and 1,5-di-hydroxynaphthalene. The halogen-containing epoxides may be further exemplified by 3-chloro-1,2-epoxybutane, 3-bromo-1,3-epoxyhexane, 3-chloro-1,2-epoxyoctane and the like.

Examples of the polymeric-type polyepoxides include the polyepoxypolyhydroxy polyethers obtained by reacting, preferably in an alkaline or an acid medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, the reaction product of bis-phenol and bis(2,3-epoxy-2-methylpropyl) ether, the reaction product of resorcinol and bis (2,3-epoxypropyl) ether, and the reaction product of catechol and bis (2,3-epoxypropyl) ether.

A further group of the polymeric polyepoxides comprises the hydroxy-substituted polyepoxide polyethers obtained by reacting, preferably in an alkaline medium, a slight excess, e.g., 0.5 to 3 mole excess, of a halogen-containing epoxide as described above, with any of the aforedescribed polyhydric phenols, such as resorcinol, catechol, bis-phenol, bis(2,2'-dihydroxy-dinaphthyl)methane and the like.

Also included within this group are the polyepoxy polyethers obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethyleneglycol, butylene glycol and the like, and subsequently treating the resulting product with an alkaline component.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl-2,3-epoxypropyl ether), poly(2,3-epoxypropyl crotonate), allyl-2,3-epoxypropyl ether-styrene copolymer, methallyl-3,4-epoxybutyl ether-allyl benzoate copolymer, poly(vinyl-2,3-epoxypropyl ether), allyl glycidyl ether-vinyl acetate copolymer and poly(4-glycidyloxystyrene).

Examples of non-terminal polyepoxides include epoxidized esters of polyethylenically unsaturated monocarboxylic acids, such as epoxidized linseed, soybean, perilla, oiticica, tung, walnut and dehydrated castor oil, methyllinoleate, butyl linoleate, ethyl 9,12-ocetadecadienoate, butyl 9,12-15-octadecatrienoate, butyl eleostearate, monoglycerides of tung oil fatty acids, monoglycerides of soybean oil, sunflower, rapeseed, hemseed, sardine, cottonseed and the like.

Another group of non-terminal polyepoxides includes the epoxidized esters of unsaturated monohydric alcohols and polycarboxylic acids, such as, for example, di(2,3-epoxybutyl) adipate, di(2,3-epoxybutyl) oxalate, di(2,3-epoxyheptyl) succinate, di(2,3-epoxybutyl) maleate, di(2,3-epoxyoctyl) pimelate, di(2,3-epoxypropyl) phthalate, di(2,3-epoxycyclohexyl) adipate, di(2,3-epoxypentyl) thiodipropionate, di(5,6-epoxytetradecyl) diphenyldicarboxylate, di(3,4-epoxyheptyl) sulfonyldibutyrate, tri(2,3-epoxypropyl) 1,2,4-butanetricarboxylate, di(5,6-epoxypentadecyl) tartarate, di(4,5-epoxytetradecyl) maleate, di(3,-4-epoxybutyl) citrate, and di(4,5-epoxyoctadecyl) malonate. Preferred members of this group comprise the glycidyl esters, such as the glycidyl esters of the dicarboxylic acids preferably containing from 2 to 18 carbon atoms, such as diglycidyl phthalate, diglycidyl maleate, diglycidyl adipate, diglycidyl sebacate, diglycidyl cyclohexanedicarboxylate and the like.

Another group of the polyepoxides includes the epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials includes epoxidized derivatives of polyethylenically unsaturated polycarboxylic acids such as, for example, dimethyl 8,9,12,13-diepoxyeiconsanedioate,
dibutyl 7,8,11,12-diepoxyoctadecanedioate,
dioctyl 10,11-diethyl-8,9,12,13-diepoxy-eiconsanedioate,
dihexyl 6,7,10,11-diepoxyhexadecanedioate,
didecyl 9-epoxy-ethyl-10,11-epoxyoctadecanedioate,
dibutyl 3-butyl-3,4,5,6-diepoxycyclohexane-1,2-dicarboxylate,
dicyclohexyl 3,4,5,6 - diepoxycyclohexane - 1,2-dicarboxylate,
dibenzyl 1,2,4,5 - diepoxycylcohexane - 1,2 - dicarboxylate and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexane and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Particularly preferred epoxy-containing organic materials to be employed in the process of the invention are the members of the group consisting of the organic compounds possessing a plurality of epoxyalkoxy radicals, e.g., two to four, joined to an organic radical which contains from one to two aromatic rings, organic compounds possessing a plurality of epoxyhydroxyalkoxy radicals, e.g., two to four, joined to an organic radical containing from one to two aromatic rings, the polyepoxy-containing polymeric reaction product of an aromatic polyhydric phenol and epihalohydrin, the polyepoxy-containing polymeric reaction product of an aliphatic polyhydric alcohol and epichlorohydrin, the polyepoxy-containing polymeric reaction product of a polyhydric phenol and a polyepoxide compound, the polyepoxy-containing polymeric reaction product of an aliphatic polyhydric alcohol and a polyepoxide compound, the polymers of the epoxy-containing monomers possessing at least one polymerizable ethylenic linkage prepared in the absence of alkaline or acidic catalysts, and copolymers of the foregoing epoxy-containing monomers and a monomer containing at least one $CH_2=C=$ group prepared in the absence of alkaline or acidic catalysts. The expression "epoxyalkoxy" radical refers to an alkoxy radical substituted with an epoxy group. The expression "epoxyhydroxyalkoxy radical" refers to an alkoxy radical substituted with a hydroxyl and epoxy group.

Coming under special consideration, particularly because of the fine quality of coatings prepared from their resinous products are the monomeric and polymeric-type glycidyl polyethers of dihydric phenols obtained by reacting epichlorohydrin with a dihydric phenol in an alkaline medium. The monomeric products of this type may be represented by the general formula

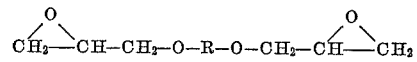

wherein R represents a divalent hydrocarbon radical of the dihydric phenol. The polymeric products will generally not be a single simple molecule but will be a complex mixture of glycidyl polyethers of the general formula

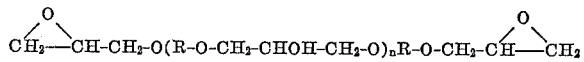

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The poyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess, to the epichlorohydrin. The reaction is preferably accomplished at temperatures within the range of from 50° to 150° C. The heating is continued for several hours to effect the reaction and the product is then washed free of salt and base.

Preferred members of the above-described group of polyepoxides are the glycidyl polyethers of the dihydric phenols, and especially 2,2-bis(4-hydroxyphenyl) propane, having an epoxy equivalency between 1.0 and 2.0 and a molecular weight between 900 and 2900. Particularly preferred are those having a Durrans mercury method softening point of at least about 100° C.

Another suitable group of polyglycidyl ethers for use in this invention are the polyglycidyl ethers of alpha, alpha-omega, omega-tetrakis(hydroxyaryl) alkanes. This group of compounds is described and illustrated in U.S.

2,806,016 to Schwarzer. The polyglycidyl ether prepared as in Example 1 of said patent has a melting point of about 85° C. and contains 0.452 epoxy equivalent per 100 grams.

The following examples will serve to illustrate the invention:

EXAMPLE 1

Methanol (100 cc.) and 1,4-cyclohexane bis (methyl amine) (CHMA) (142 g.) were placed in a one liter, three-necked flask equipped with stirrer, reflux condenser and dropping funnel. The acrylonitrile (132 g.) was added slowly over a period of 45 minutes to the refluxing solution. No heat was used. After standing over night the solution was heated to reflux for three hours. The methanol and excess acrylonitrile were stirred off. On cooling, the residue, which weighed 246.3 g., solidfied. The yield corresponded to approximately two moles of acrylonitrile added for each mole of 1,4-cyclohexane bis methyl amine. The crude product was dissolved in an equal weight of boiling methanol, decolorized with charcoal, filtered and cooled to room temperature. Some crystals formed which were filtered off and dried (wt.=90 g.), M.P.=95–98° C.

A small sample was recrystallized from methanol again. It melted at 96.6–99° C. and had the following analyses:

|   | Found | Theory [1] |
|---|---|---|
| C | 67.76 | 67.71 |
| H | 9.54 | 9.74 |
| N | 22.32 | 22.56 |

[1] Calculated for $C_{14}H_{24}N_4$.

This solid is the derivative of the trans form of 1,4-cyclohexane bis methyl amine.

The liquid product which comprises the remainder is largely derived from the cis isomer plus some tri and tetra cyanoethylated diamine.

EXAMPLE 2

Hydrogenation of liquid cyanoethylation products

The liquid portion from two cyanoethylation runs (259.6 g.), 130 cc. of absolute methanol and 13 g. of Raney nickel catalyst (dry basis) washed with methanol were charged to a one-liter Magna Dash Autoclave (Autoclave Engineers Inc.). The bomb was flushed with hydrogen, 47 g. of $NH_3$ added, then placed under 730 lbs. total pressure at room temperature with hydrogen, sealed, and stirred while heating to 120° C. The pressure had risen to 800 p.s.i. at 95° C., then dropped to 730 p.s.i. by the time the temperature reached 120° C. It was opened to tank pressure (730 p.s.i.) and held between 120 and 125° C. for four hours and forty minutes. The contents were cooled and the hydrogen and $NH_3$ vented. The catalyst was filtered off and the solvent stripped off leaving 233 g. of product. The product analyzed as follows:

Total amine No. _____ 849.4
I° amine No. _____ 502.0
II° amine No. _____ 256.4
III° amine No. _____ 91.0
Gardner viscosity _____ E

EXAMPLE 3

Curing epoxy resins with solid dicyanoethylated CHMA

Solid dycanoethylated 1, 4-cyclohexane bis methyl amine (CHMA) (35 g.) was added to 160 g. of an epoxy resin derived from bisphenol A and epicholorhydrin having an epoxy equivalent weight of 526 which had been previously melted and heated to 135° C. The solution of the two was thoroughly mixed over a period of five minutes, then poured on a Teflon sheet to cool. The material solidified to a brittle solid on cooling to room temperature. It was ground and passed through an 80 mesh sieve. Four grams of Cab-O-Sil M5 was dispersed in 131 g. of the powdered resin by mixing in a Waring Blendor. Steel panels and a steel coupon were heated to 150° C. and dropped in the powder in fluidizer. After curing for one hours at 150° C. an 8 mil film had a pencil hardness of H–B and passed the extensibility and adhesion test. Edge coverage on the ½″ x ½″ x 4″ steel coupon was 65%.

EXAMPLE 4

Modifying epoxy resins with dicyanoethylated CHMA

The epoxy resin referred to in Example 3 (315 g.) was heated to 150° C. in a can placed in an oil bath. To this was added 24.5 g. of cyanoethylated CHMA which was melted and dissolved in the hot epoxy resin. The solution was stirred at this temperature for thirty minutes and a sample taken for oxirane oxygen determination in which the amine was corrected for—oxirane oxygen=1.8%.

Three hundred grams of the modified resin was held at 150° C. and 52.5 g. of 2,4-diamino 6-heptadecyl 1,3,5-triazine was added and after solution was complete and homogeneous (3 minutes) the product was poured on a Teflon sheet to cool. The resin had an oxirane oxygen content of 1.5% after correcting for amine present.

The resin was ground and passed through a 60 mesh screen. The screened resin was placed in a fluidizer and panels preheated to 150° C. were dipped in the resin. The coated panels (6 mil film) were cured at 160° C. for 1, 2 and 3 hours. The cured panels all passed the extensibility and adhesion test; however, the 2 and 3 hour cures also passed the 120″ pound impact test.

EXAMPLE 5

Curing epoxy resins with hydrogenated liquid dicyanoethylated CHMA

The product obtained in Example 2 was combined with different proportions of a liquid epoxy derived from bisphenol A and epichlorohydrin having an epoxy equivalent weight of 200. Castings were made and cured at 160° C. for three hours. The results of the test are tabulated below:

| Expt. | Epoxy resin (g.) | Liquid hydrogenated product (g.) | Barcol hardness | HDT, °C. | Flexural strength | Flexural modulus, p.s.i. |
|---|---|---|---|---|---|---|
| 1 | 20 | 4.8 | 48 | 112 | 10,900 | $3.1 \times 10^5$ |
| 2 | 20 | 4.6 | 49 | 116 | 8,000 | $2.95 \times 10^5$ |
| 3 | 20 | 4.4 | 50 | 112 | 10,500 | $3.3 \times 10^5$ |
| 4 | 20 | 4.2 | 46 | 112 | 9,200 | $4.7 \times 10^5$ |
| 5 | 20 | 4.0 | 53 | 105 | 11,800 | $3.4 \times 10^5$ |

EXAMPLE 6

Cyanoethylation of 2,3,5,6-tetrachloro p-xylene $a,a'$-diamine

The 2,3,5,6-tetrachloro p-xylene $a,a'$-diamine (137 g.) was placed in a 1 liter, three-necked flask equipped with mechanical stirrer, reflux condenser and dropping funnel. Methanol (500 cc.) was added and the mixture heated to reflux. It was necessary to do this to bring the diamine into solution. The acrylonitrile was then slowly added to the refluxing solution and heating continued for another three hours after addition of acrylonitrile was complete. After standing overnight, it was again heated to reflux; however, the solid never went into solution again. Refluxing was continued for four hours. The solid was then separated out. A total of 180.8 g. of crude product was recovered. This was purified by crystallizing from denatured ethanol (10–1) ratio. The purified product was crystalline and had a M.P. of 116° C. It had a nitrogen content of 14.3% which was near theory for the dicyanoethylated material.

EXAMPLE 7

Modifying epoxy resins with dicyanoethylated 2,3,5,6-tetrachloro p-xylene α,α'-diamine A liquid epoxy resin derived from bisphenol A and epichlorohydrin with an epoxy equivalent weight of 190 (120 g.) and the above dicyanoethylated product were mixed and heated to 150° C. for four hours. At this point, 2,4-diamino 6-heptadecyl 1,3,5-triazine 25 g. was added and the temperature kept at 150° C. for an hour. It was then poured on a Teflon sheet to cool. Analysis showed an oxirane oxygen content of 2.2% (corrected for amine present). The resin was ground and passed through an 80 mesh screen. The powder was sprayed on hot (450°) steel panels and cured for five minutes at 450° F. Film thickness as 5–6 mils. The cured film passed the extensibility and adhesion test showing that it was an extensible film.

EXAMPLE 8

Cyanoethylation of 1,4-bis(β-aminoethyl) benzene and evaluation thereof in epoxy systems Into a three-necked 500 ml. flask equipped with a heating mantle, stirrer, thermometer, dropping funnel, reflux vacuum condenser and a distillate thermometer, were placed 82 grams (0.5 mole) of 1,4-bis(β-aminoethyl) benzene and 100 ml. of methanol. To the agitating solution were slowly added (dropwise) a 50% solution of 53 grams (1 mole) of acrylonitrile in methanol. The exotherm of the addition held the pot temperature at 50–57° C. After the addition of the acrylonitrile was completed, external heat was applied and the contents brought to boiling. The reactants were refluxed for three hours. At this point the distillate was permitted to come off. Then water pump vacuum was applied to the system and the residual distillate pulled off until the pot temperature reached 100° C. The product was cooled to room temperature and weighed to give 131 grams of a liquid product. This product had an amine value of 407 (theoretical 404) and a percent nitrogen of 20.2 (theoretical 20.7).

This product was evaluated with a solid epoxy resin derived from bisphenol A and epichlorohydrin and having an epoxy equivalent weight of 925 as follows: 260.7 grams of epoxy resin were weighed into an appropriate container and melted on a hot plate. A metal thermometer was used to stir the epoxy and provide temperature readings. At the point where the epoxy attained 140° C., 39.3 grams of the amine were added and stirred into the epoxy until it appeared to be homogeneous. The product was immediately poured onto Teflon where it cooled and solidified.

The product was then passed through the micro-pulverizer. The resulting powder was checked as to its gel time (at 300 and 400° F.) and cure time (300 and 450° F.). The gel time was determined by placing a small portion of resin on a steel panel and heating to the designated temperature and timing it to the point of gel, while stirring the melted resin with a small stick. Cure time was determined by spraying the resin onto 0.075 inch sandblasted steel panels (3 inch x 6 inch) heated to the designated temperature and immediately placing them in an oven set at the same temperature to be cured for varying periods of time. Upon cooling the panels to room temperature the coatings were then checked for rate of cure by subjecting them to the extensibility and adhesion test. The results were as follows:

Gel time at 300° F.—9 to 10 minutes
Gel time at 400° F.—2.5 to 3 minutes
Cure time, 1 min. at 450° F.—Failed extensibility and adhesion test
Cure time, 3 min. at 450° F.—Passed extensibility and adhesion test
Cure time, 5 min. at 450° F.—Passed extensibility and adhesion test
Cure time, 10 min. at 300° F.—Failed extensibility and adhesion test
Cure time, 15 min. at 300° F.—Failed extensibility and adhesion test
Cure time, 20 min. at 300° F.—Failed extensibility and adhesion test
Cure time at 450° F.—3 to 4 minutes
Cure time at 300° F.—Greater than 20 minutes This product exhibited only very slight bubbling and the coating appeared relatively smooth.

EXAMPLE 9

Cyanoethylation of 1,4-cyclohexyl bis(methylamine) and evaluation thereof in epoxy systems Into a 2 liter three-necked flask equipped with stirrer, reflux condenser and dropping funnel were placed 426 grams of the 1,4-cyclohexyl bis(methyl amine) and 300 ml. of methanol. To the agitating solution were slowly added (dropwise) 396 grams of acrylonitrile. A slight exotherm developed. The material was then refluxed for three hours to complete the reaction. The alcohol and excess acrylonitrile were distilled off (pot temperature 73 to 220° C.). The resulting product weighed 769 grams and crystallized immediately when cooled. This product had an amine number of 436.

This product was then reacted with the epoxy resin of Example 3. Into an appropriate container were added 178.8 grams of epoxy resin and then melted by heating to 160° C. 21.2 grams of the amine were slowly added and the mixture thoroughly blended. The temperature had been lowered to 120° C. during addition of the amine. The temperature was raised to 150° C. and maintained there for eight minutes. The product was then discharged on Teflon and cooled to room temperature. The ensuing solid was ground twice in the micro-pulverizer and then evaluated as described in Example 1 giving the following results:

Gel time (400° F. on steel panels)—3.5 to 4 minutes
Cured 3 minutes at 450° F.—Failed extensibility and adhesion test
Cured 4 minutes at 450° F.—Passed extensibility and adhesion test
Cured 5 minutes at 450° F.—Passed extensibility and adhesion test
Estimated cure time at 450° F.—4 minutes The coating contained some bubbles
This product was also evaluated with the epoxy resin of Example 8 as follows:
264.6 g. of epoxy resin were thoroughly mixed, as above, with 35.4 g. of the amine. The material was chilled and ground in the micro-pulverizer and then evaluated as described in Example 8 giving the following results:

Cured 20 min. at 300° F.—Passed extensibility and adhesion test
Cured 30 min. at 300° F.—Passed extensibility and adhesion test
Cured 40 min. at 300° F.—Passed extensibility and adhesion test Cured 50 min. at 300° F.—Passed extensibility and adhesion test
Cured 60 min. at 300° F.—Passed extensibility and adhesion test
Cured 1 min. at 450° F.—Failed extensibility and adhesion test
Cured 2 min. at 450° F.—Passed extensibility and adhesion test
Cured 3 min. at 450° F.—Passed extensibility and adhesion test
Cured 4 min. at 450° F.—Passed extensibility and adhesion test
Cured 5 min. at 450° F.—Passed extensibility and adhesion test
Cure time at 300° F.—20 to 30 min.
Cure time at 450° F.—1 to 2 min.

The embodiments of the invention in which an exclusive property or privilege is claimed are defined as follows:

1. Compounds having the following formula:

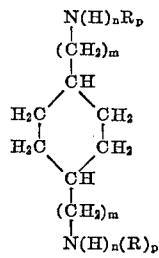

where the R groups are the same and are

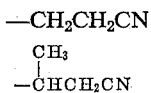

or

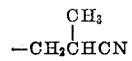

$m$ is 1 or 2, $n$ is 0 or 1, $p$ is 1 or 2 and the sum of $n$ plus $p=2$.

2. The compound having the following formula:

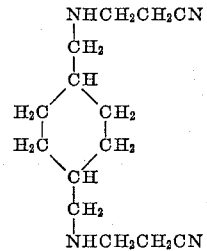

References Cited

UNITED STATES PATENTS

| | | | |
|---|---|---|---|
| 2,768,208 | 10/1956 | Pedersen | 260—570.5 |
| 3,143,566 | 8/1964 | Surrey | 260—465 XR |
| 3,244,750 | 4/1966 | Humber | 260—563 |

CHARLES B. PARKER, Primary Examiner

S. T. LAWRENCE III, Assistant Examiner

U.S. Cl. X.R.

260—2, 18, 47, 88.3, 348, 465, 563, 570.5

PO-1050
(5/69)

UNITED STATES PATENT OFFICE
CERTIFICATE OF CORRECTION

Patent No. 3,478,081    Dated    November 11, 1969

Inventor(s)   Stuart A. Harrison and John E. Wicklatz

It is certified that error appears in the above-identified patent and that said Letters Patent are hereby corrected as shown below:

Column 1, line 55, change "CHCH$_2$CH" to --CHCH$_2$CN--
Column 2, line 51, change "epoxides" to --epoxies--; line 64, change "NHR'CH" to --NHR'CN--
Column 3, line 50, add quotation marks (") after "equivalency"
Column 5, line 15, change "hemseed" to --hempseed--
Column 7, line 15, change "stirred" to --stripped--; line 41, change "portion" to --portions--
Column 8, lines 4, 41, 52, change "160" to --150--; line 6, change "526" to --525--; line 26, delete "was"

SIGNED AND
SEALED

JUN 2 1970

(SEAL)
Attest:

Edward M. Fletcher, Jr.

Attesting Officer

WILLIAM E. SCHUYLER, JR.
Commissioner of Patents